US006591520B1

(12) United States Patent
Abascal Rubio et al.

(10) Patent No.: US 6,591,520 B1
(45) Date of Patent: Jul. 15, 2003

(54) CENTRIFUGAL THROWER-CRUSHER FOR AGGREGATES AND OTHER MATERIALS

(76) Inventors: Jose Manuel Abascal Rubio, c/Iturralde y Suit, 11-2º, 31004 Pamplona (Navarra) (ES); Pedro Abascal Rubio, Comunidad de Galicia, 2-3ºA, 31010 Barañain (Navarra) (ES); Javier Abascal Rubio, C/Itaroa, 190, 31620 Gorraiz (Navarra) (ES); Ignacio Abascal Rubio, Avda.de Egües, 64-2ºB, 31620 Gorraiz (Navarra) (ES); Jose Fermin Garralda Arizcun, c/Arrieta, 2-5ºA, 31002 Pamplona (Navarra) (ES)

( * ) Notice: Subject to any disclaimer, the term of this patent is extended or adjusted under 35 U.S.C. 154(b) by 0 days.

(21) Appl. No.: 09/959,397

(22) PCT Filed: Apr. 28, 2000

(86) PCT No.: PCT/ES00/00157

§ 371 (c)(1),
(2), (4) Date: Oct. 24, 2001

(87) PCT Pub. No.: WO00/66840

PCT Pub. Date: Nov. 9, 2000

(30) Foreign Application Priority Data

May 3, 1999 (ES) .............................................. 9900905

(51) Int. Cl.[7] .......................... E02F 3/18; A62C 39/00; A01B 33/04

(52) U.S. Cl. .......................... 37/357; 37/387; 172/108; 172/123

(58) Field of Search .......................... 37/357, 387, 385, 37/205, 209, 222, 223, 224, 242, 244, 247, 248, 326–328, 343, 347, 365; 172/111, 123, 118, 108

(56) References Cited

U.S. PATENT DOCUMENTS

| | | | | | |
|---|---|---|---|---|---|
| 1,070,198 | A | * | 8/1913 | Stevens et al. | |
| 2,561,701 | A | | 7/1951 | Hurlbert | |
| 3,452,461 | A | * | 7/1969 | Hanson | |
| 4,755,001 | A | * | 7/1988 | Gilbert | 299/39 |
| 4,819,886 | A | | 4/1989 | Lambert | 241/186.1 |
| 4,852,656 | A | | 8/1989 | Banahan | 169/91 |
| 5,214,867 | A | | 6/1993 | Weatherly et al. | 37/35.7 |
| 5,564,205 | A | * | 10/1996 | Smith | 37/386 X |

FOREIGN PATENT DOCUMENTS

| | | |
|---|---|---|
| DE | 28 26 191 | 12/1979 |
| ES | 8404138 | 7/1984 |
| ES | 2 011 522 | 1/1990 |
| ES | 2 111 447 | 3/1998 |
| FR | 1 044 466 | 11/1953 |
| FR | 2 705 908 | 12/1994 |
| GB | 1 114 946 | 5/1968 |
| GB | 1 255 967 | 12/1971 |
| WO | WO 97/16606 | 5/1997 |

* cited by examiner

*Primary Examiner*—Christopher J. Novosad
(74) *Attorney, Agent, or Firm*—Gary M. Nath; Marvin C. Berkowitz; Sheldon M. McGee

(57) ABSTRACT

Centrifugal thrower-crusher device for arid matter and other materials having a revolvable inertia wheel (1) and mallets (2) diametrally matched on at least one face of the wheel inside a housing (3) with a front opening (8) at the side in which the mallets (2) are housed in a peripheral channel (17), while in the periphery another opening is defined (9), through which the materials leave thrown selectively in a centrifugal projection.

4 Claims, 6 Drawing Sheets

CENTRIFUGAL THROWER-CRUSHER FOR AGGREGATES AND OTHER MATERIALS

The present invention refers to a centrifugal throwing device, able to throw arid matter such as stones, earth, gravel, etc. . . . at great distance; they are to be applied for diverse activities, in mining and public works, as well as in forest and agricultural environments.

Within the state of art, arid matter throwing machines are already known for several objectives, among which we mainly find out the extinction of fires, being all the existing machines of this type, carried out and conditioned for an application with materials of reduced size, which makes the disposition of a selective screening of the materials necessary before their introduction into the throwing device.

That is the case for example, for the machines referred to in the Patents, as well as the U.S. Pat. No. 2,561,701, U.S. Pat. No. 4,852,656 and U.S. Pat. No. 5,214,867, in which the throwing device is preceded by a screen that selects the size of the arid matter, only allowing the passage of the finest ones, to throw them by means of a blade rotor or using air driving means as in the case of the Spanish Utility model 9393104.

In the mentioned machines the product projection exit is established by means of a fixed outlet or through a directional conduit, which determines an important braking of the products in the throwing projection, making the reach limited to reduced distances.

Machines called "unstoning devices" are also known. They are generally used in the agricultural environment, to eliminate the big stones from the cultivation fields, using in this case articulators of mallets or hammers, which hit and crush the stones, letting the remains in the same place where the machine is situated, without throwing them. Such is the case, for example, for the machine referred to in the Spanish Utility Model 9601322, as well as the machines of the U.S. Pat. No. 4,819,886 and the DE 2,826,191.

In accordance with the present invention a centrifugal throwing device is proposed, developed according to a new realization and operation concept, so that no selecting screening of the materials is needed, and above all, as a fundamental feature it presents the fact it is able to direct and throw the arid matter at distances which are unreachable with the solutions known up to now.

The throwing device, object of the invention, consists in an articulator made up of an inertia wheel, on which some fixed mallets are incorporated perpendicularly at least to one of the faces, preferably matched in diametrical opposition, this articulator is housed inside a frame opened up at the side of the mallets and with a directional opening at the periphery, remaining defined inside a peripheral channel, in which the mallets are situated.

This way a device is obtained in which GB 114946 disclosed an excavating machine which incorporates a rotor with a ring shaped space, blades which extend in a radial way, which take the ground from the operating unit ramp and brush the ground along the lower plate. Two continuous belts next to the rotor at opposite sides of the rotor are situated in such a way that there is a space between them and the upper part of the rotor to leave the ground outside the rotor. These belts which are mounted on inverted guiding barrels, are a continuation of the lower plate and are driven by the rotor due to the friction. Only one belt can be used at a time to discharge the ground at one side or the other of the machine, according to the direction of rotation of the rotor. To prevent that the hauled stones and moved ground damage the belts, the barrels are made up of a set of rollers made of elastic material. the mallets act as shovels, impelling the materials centrifugally, the mentioned materials fall in the first place in the peripheral channel after entering through the lateral frame opening, so that the mentioned materials are projected radially when they find the peripheral opening.

The mass of the inertia wheel provides an impulsive capacity that allows to drag the materials with great force, exercising the mallets a catapulting action which originates long reach throwing.

The material throwing takes moreover place with direct exit through the peripheral opening without any channelling conduit, with which the use of the whole driving force is achieved, since there is no braking friction, except for the resistance of the air, reaching great distances, which can surpass fifty meters, as compared to the five or six meters reach provided by the conventional throwing devices with directional outlet conduits.

The frame periphery, in which the projection outlet opening is defined, is revolvably motive regarding the central axis, which allows to direct the mentioned projection outlet opening selectively, according to a radial direction, which is variable in height, allowing this way the regulation of the projection reach at convenience.

The throwing set is moreover foreseen in assembly disposition with the possibility of horizontal movement, allowing this way, in turn, a selective regulation of the throwing orientation in a horizontal sweeping, so that by means of this orientation and regulation of the throwing reach the projection can be to the point that is wanted within a wide operation area.

The feeding of the throwing device can be carried out through a chute that is loaded by other independent means, in charge of breaking off and picking up the materials that are to be thrown from the ground; but the throwing device can also be foreseen of means to pick up the materials from the ground while moving, being situated on a haulage vehicle.

The inertia wheel can also be foreseen of crushing edges, to carry out a crushing effect on the materials to be thrown, which are introduced into the frame, this way easing up the throwing action, mainly by reducing the dimensions of the stones and other objects of a big size, which otherwise would not enter, in the throwing channel, in view of their size.

This way an arid matter throwing device is obtained that is of great use in multiple applications, such as for example:

- the movement of arid matter or lands by means of a jet thrown into the air, in public works or similar, to cover slopes, banks, to open channels, in levelling, land levelling, etc. . . .
- the movement of arid matter or lands in works related with agriculture, for the opening of watering and drainage channels, the opening of gutters in roads, the levelling of lands, the extinction of agricultural fires, etc. . . .
- the movement of arid matter or lands in forest environments, for the opening of gutters, the realization of fire walls, the extinction of forest fires, etc. . . .
- the movement of arid matter, minerals, lands, etc. . . . in the mining area.

Figure 1:
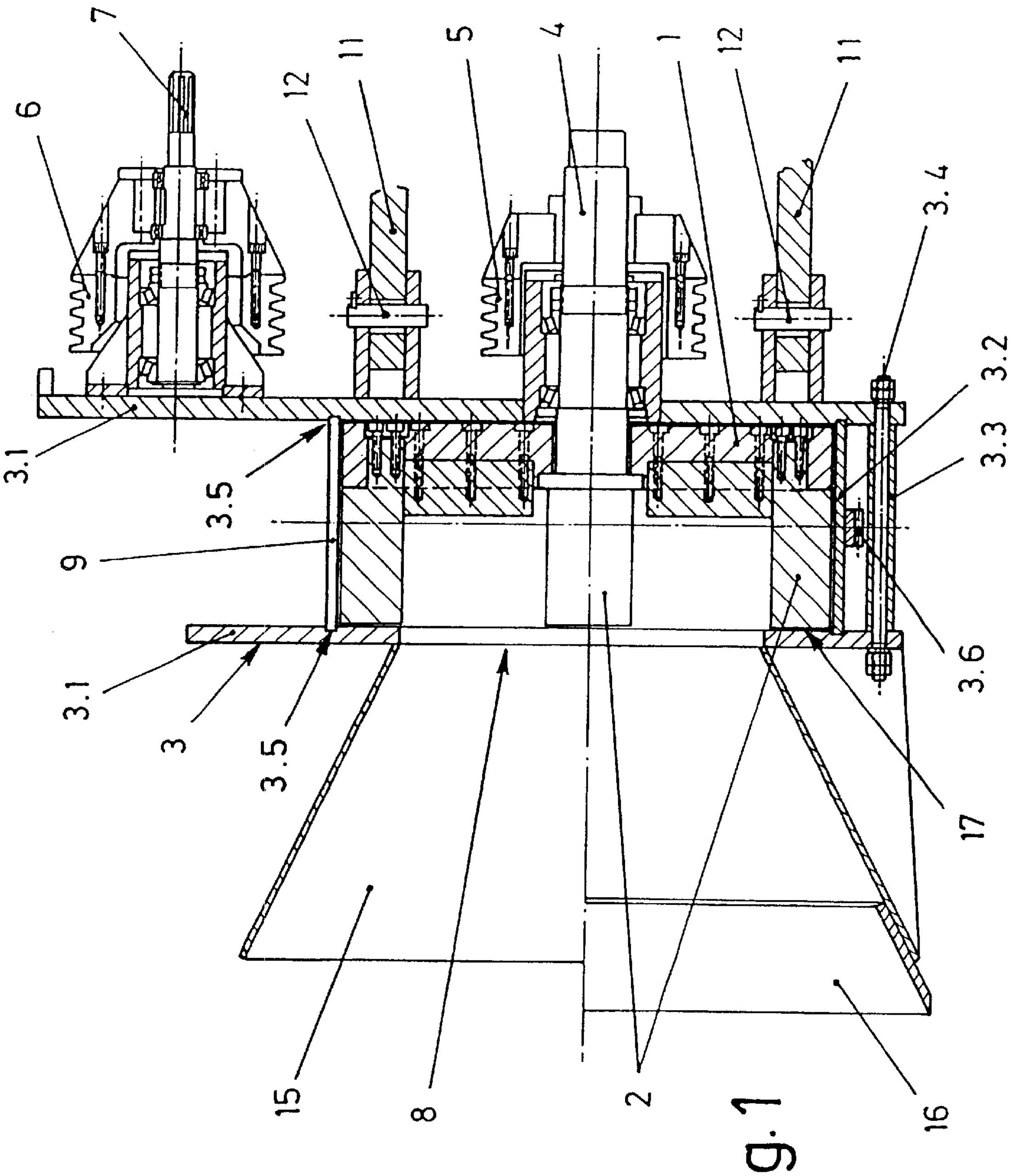
FIG. 1 represents a lateral view in section of the preconized throwing device according to a realization example.
Figure 3:
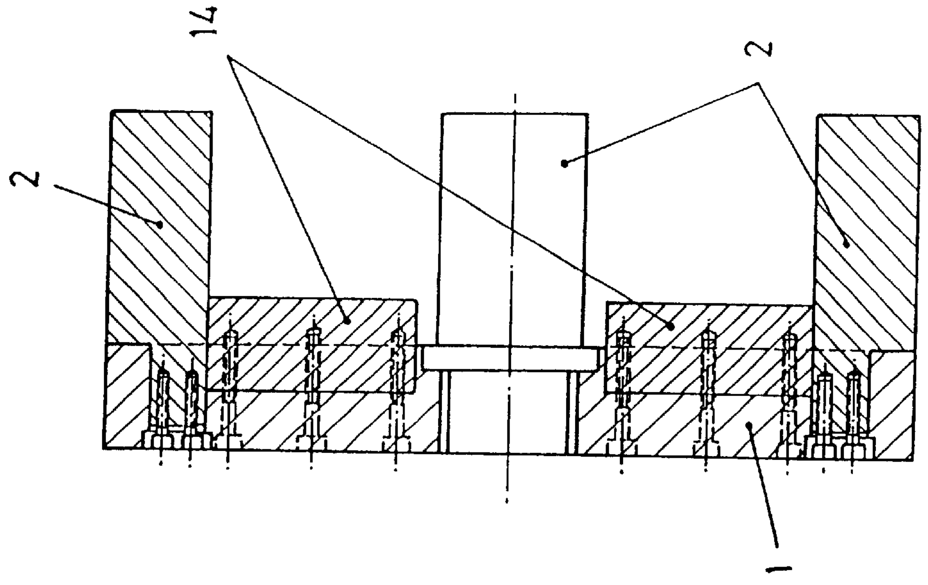
FIGS. 3 and 8 are corresponding views in diametrical section of the inertia wheel as indicated in the previous figure.
Figure 2:
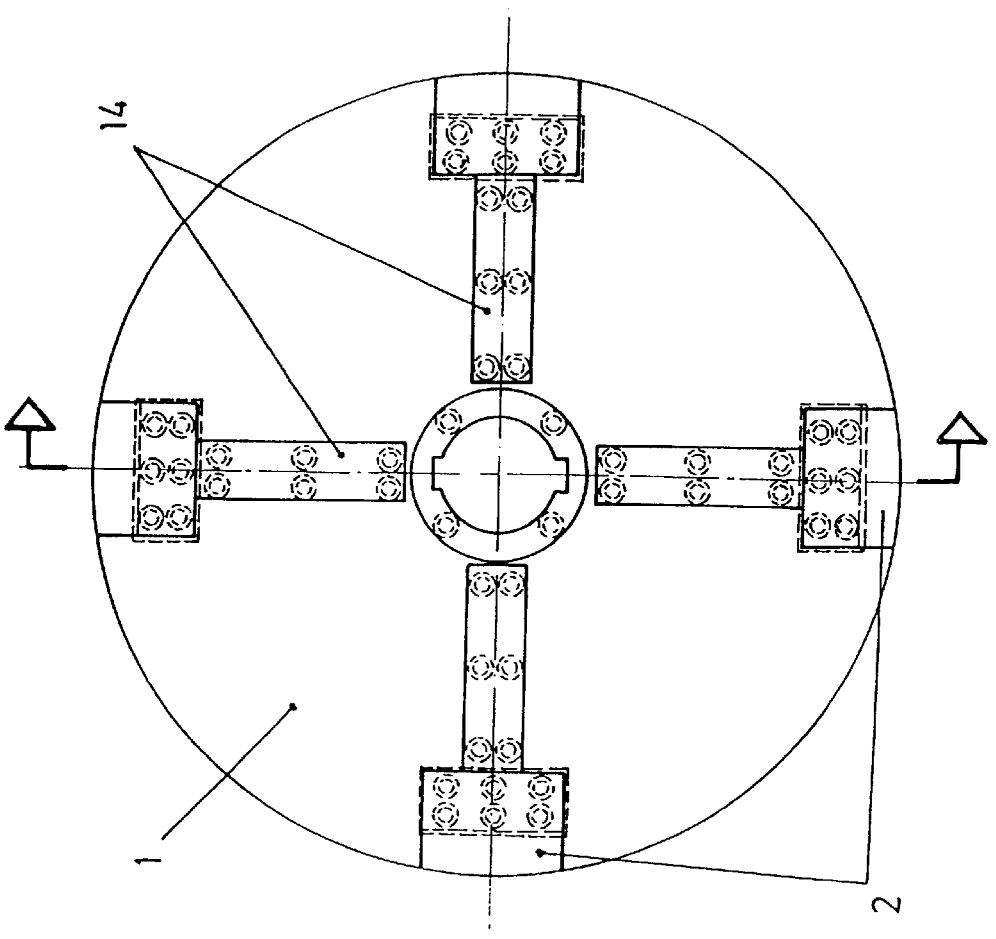
FIG. 2 is a front view of the inertia wheel of the throwing device.

The object of the invention consists in a centrifugal throwing device dedicated to the movement of materials such as earth, gravel, stones, etc. . . . by means of jet projection into the air, using for it an inertia wheel (1), provided with perpendicularly outstanding mallets (2) that function as impelling shovels.

The set of inertia wheel (1) with mallets (2) is included inside a frame (3), in assembly on a shaft (4) that stands out to connect turning impelling means. According to a realization, the mentioned shaft (4) incorporates at its outer part means (5) to connect in revolvable transmission regarding other similar means (6) situated on a motion shaft (7); without this being a limitative realization, since the revolvable operation of the shaft (4) can be determined by means of any other transmission means without altering the object.

The inertia wheel (1) can be provided with mallets (2) only at one face, or on both faces, determining in its case the frame (3) a front opening (8) correspondingly at one or at both sides, according to the mentioned mallet arrangement (2).

From the edge of the respective front opening (8) a peripheral channel (17) remains defined in each case, in which the corresponding mallets (2) are situated in the way it can be seen in FIG. 1.

The frame (3) consists in two front plates (3.1), between which a peripheral casing (3.2) is included, being the front plates (3.1) fixed to each other by means of separating bushings (3.3) and fastening screws (3.4); while the peripheral casing (3.2) remains situated by means of lateral fittings (3.5) regarding the mentioned front plates (3.1), being these fittings (3.5) built up as slipping guides that allow the revolvable mobility of the mentioned peripheral casing (3.2).

In the mentioned peripheral casing (3.2) an opening (9) remains determined, also incorporating lengthwise at the outside a rack, through which the angular movement of the referred peripheral casing (3.2) is possible, by means of a motor or any other operation transmission means, for the suitable selective orientation of the opening (9).

Figure 6:
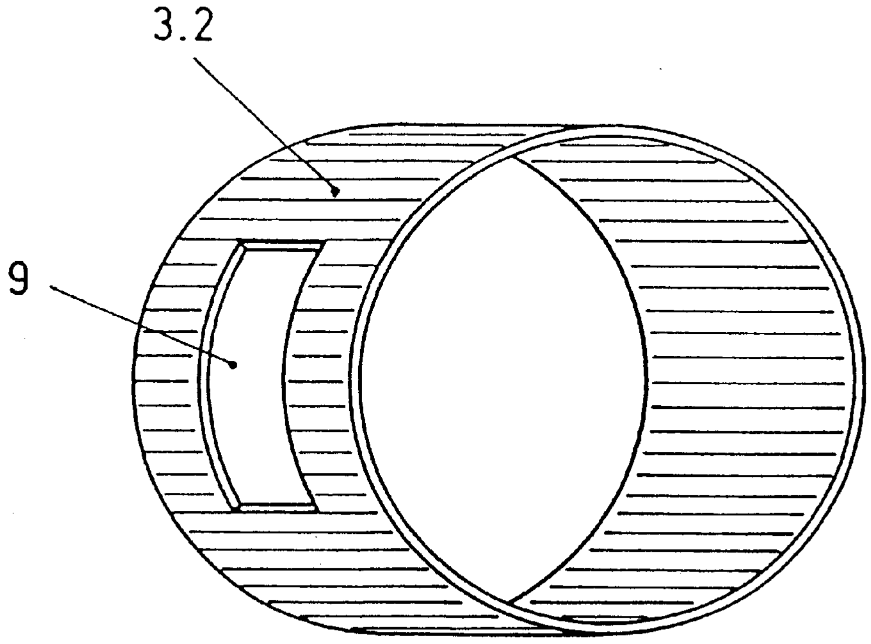
FIG. 6 is a perspective of the peripheral casing of the thrower frame, according to a realization of the mentioned casing in an annular way opened up at the two faces.
Figure 7:
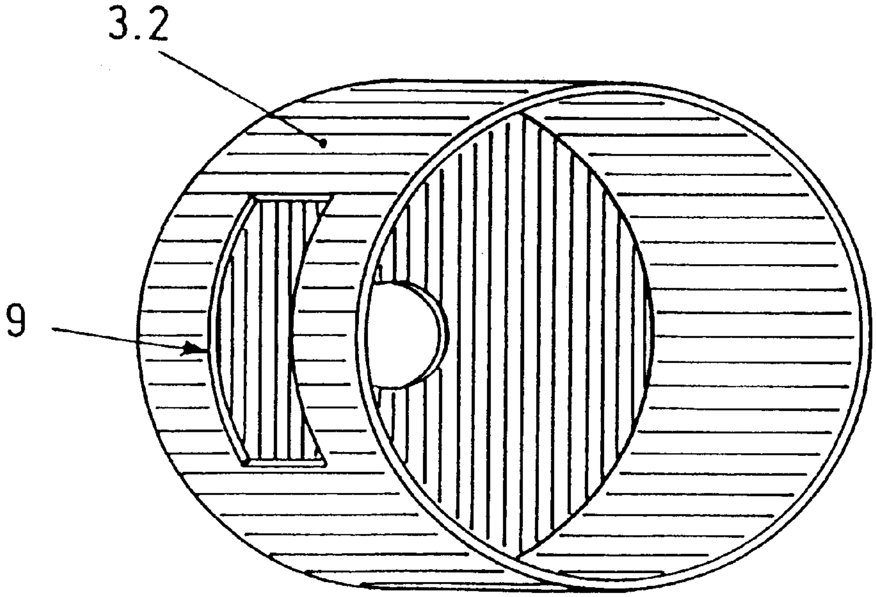
FIG. 7 is a perspective of the peripheral casing of the thrower frame, according to a realization of the mentioned casing in bowl shape.
Figure 8:
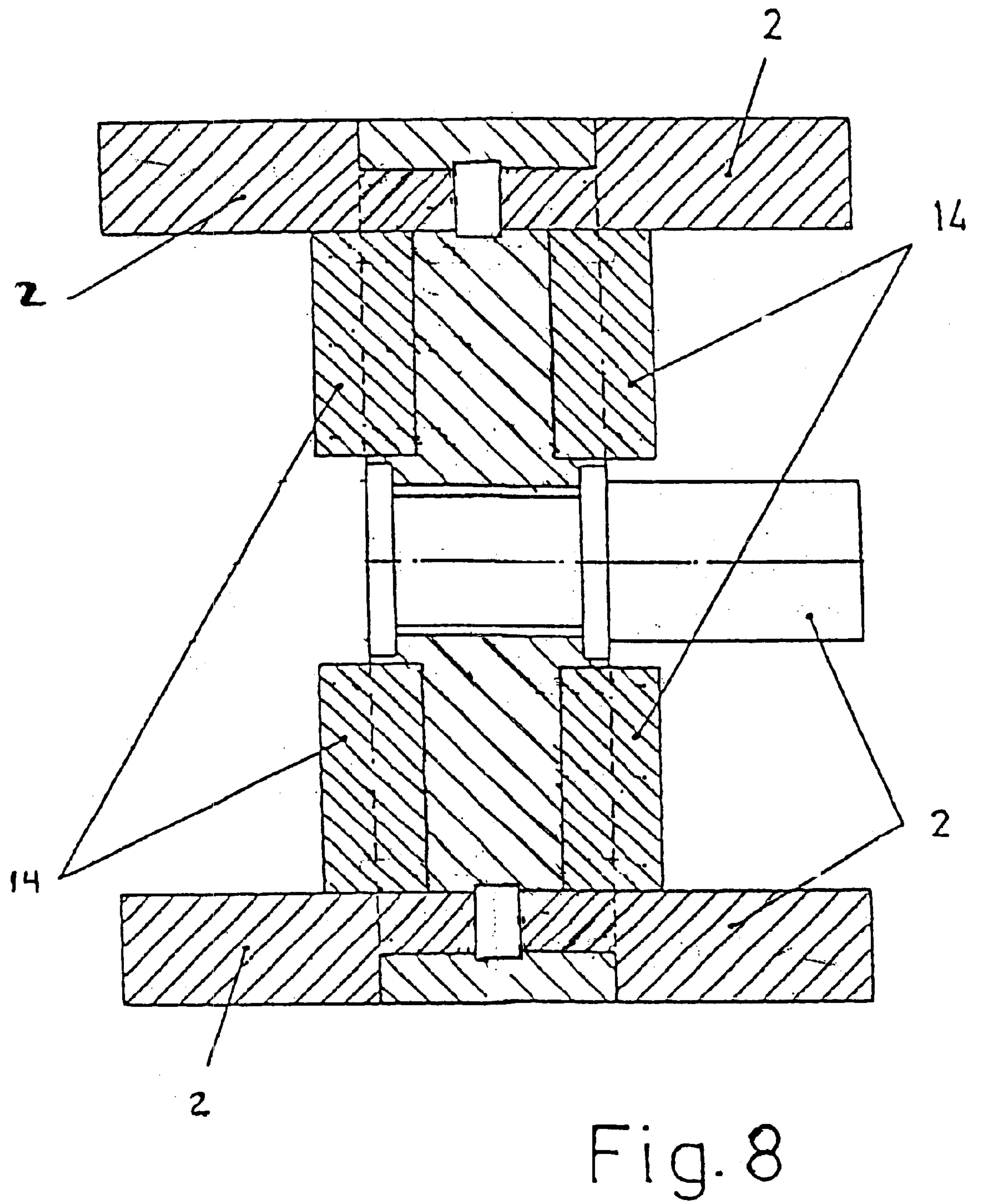

According to a realization, the mentioned peripheral casing (3.2) can be ring-shaped, i.e. opened up at the two faces, in the way it is represented in FIG. 6, for the disposition in assembly according to FIG. 1, but so as to have a greater according to warping, a realization of the mentioned peripheral casing (3.2) is possible in the shape of a bowl, in the way it is represented in FIG. 7, with a central opening in the closed part of the passage of the shaft (4) during the assembly.

This way, by establishing the revolvable operation of the inertia wheel (1), when introducing materials of any kind (earth, gravel, stones, etc. . . .) in the frame (3), through the respective front opening (8), when these materials enter the peripheral channel (17) they are revolvably beaten and pushed by the mallets (2), which by means of this action give a centrifugal impulse, which makes that the mentioned materials tend to leave projected radially, so that when they find the peripheral opening (9) they are thrown out through it.

Figure 4:
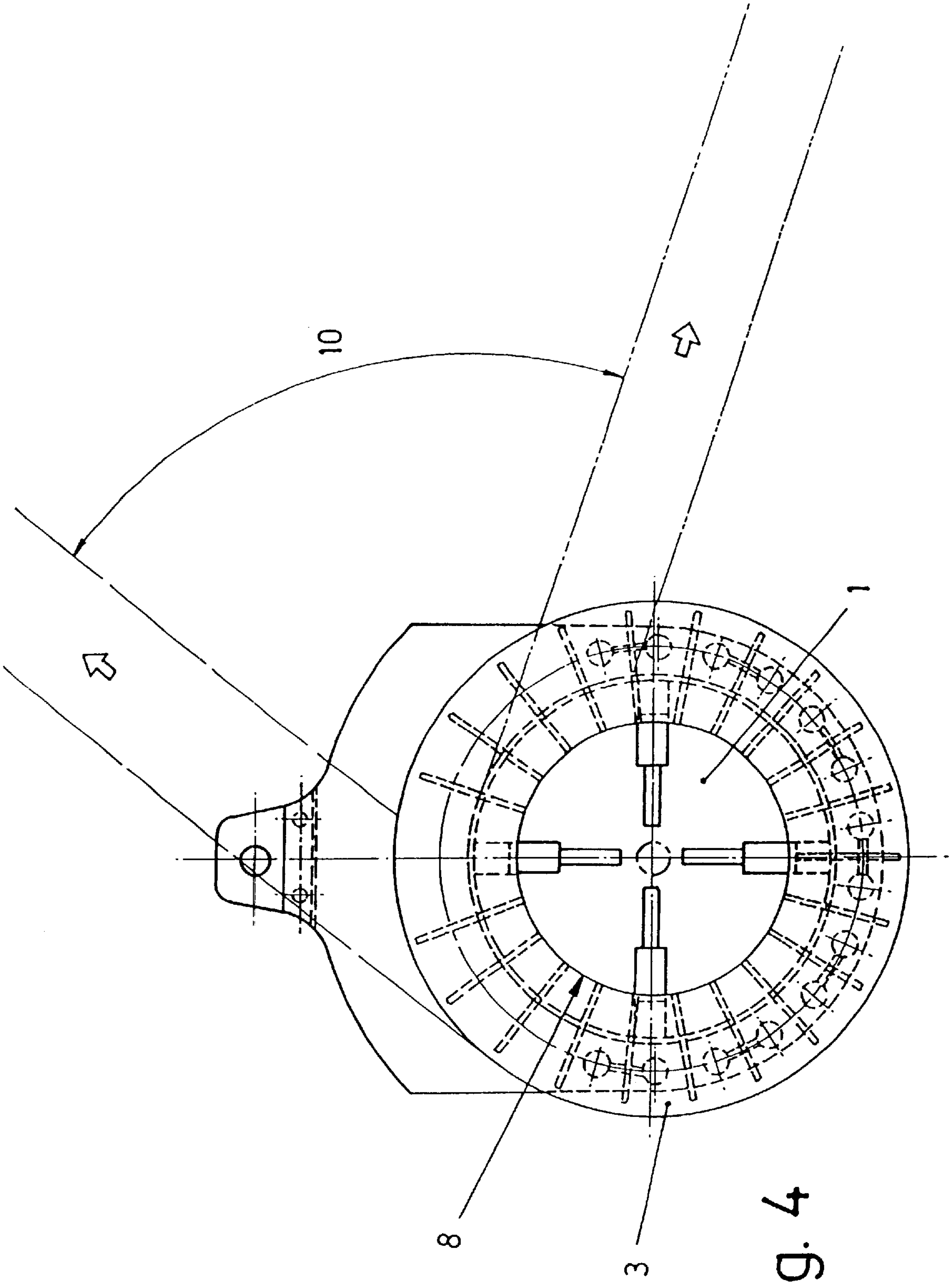
FIG. 4 is a front view of the throwing device indicating the angle of the selective vertical variation of the throwing direction.

The throwing direction varies in height according to the opening position (9), which can be regulated selectively in an angle (1), as can be observed in FIG. 4, by means of the revolvable mobility of the peripheral casing (3.2), so that the fall of the thrown materials takes place at the wanted place. In any case, the exit of the materials takes place in a free way, without any braking action that diminishes the throwing, as there is no projection conduit in which friction could take place.

Figure 5:
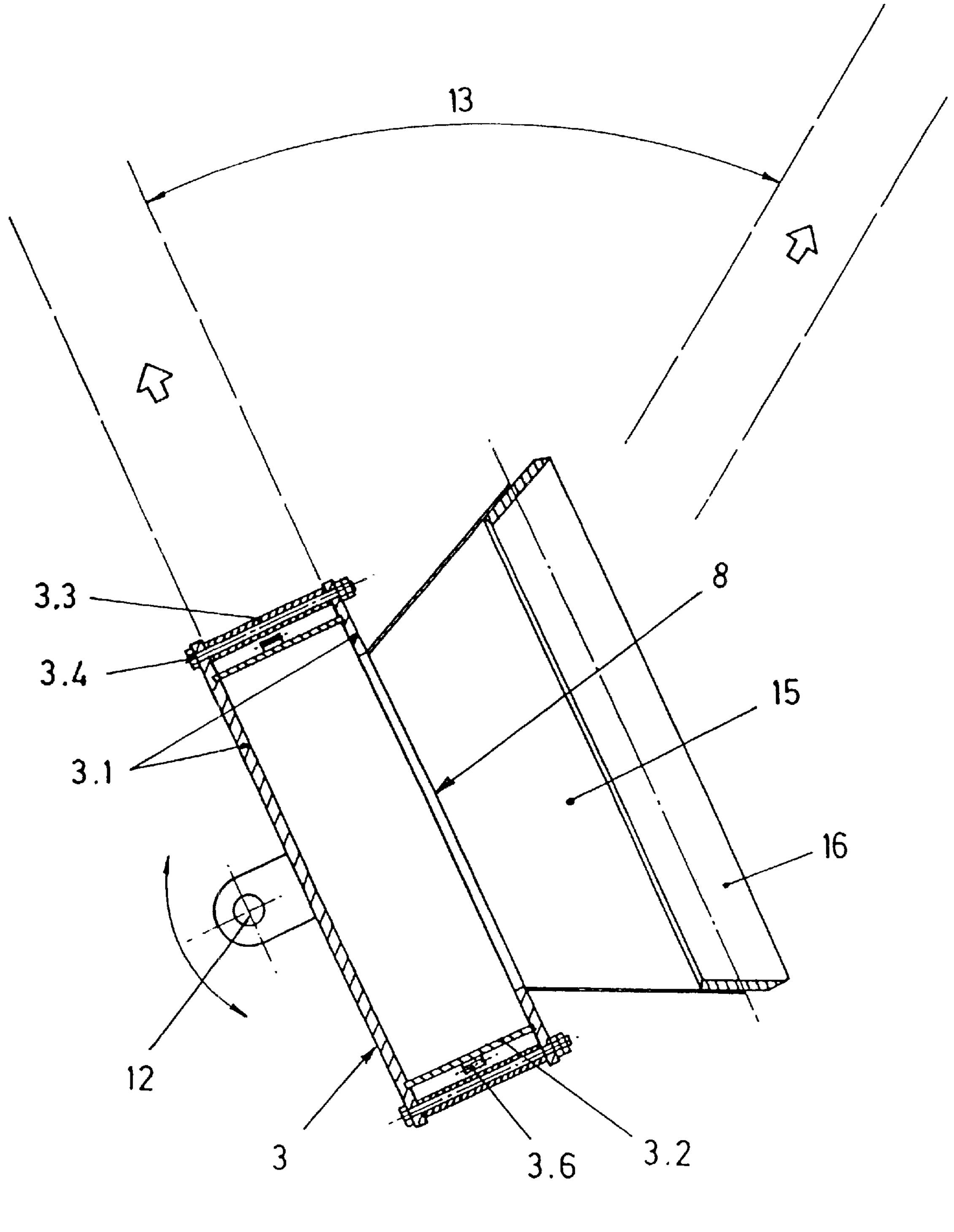
FIG. 5 is a view in ground plan of the thrower frame, indicating the angle of the selective horizontal variation of the throwing direction.

The frame (3) is also foreseen to be situated in a fixing assembly regarding to supports (11), as it is appreciated in FIG. 1, with decisive joining of a vertical shaft (12), regarding which the throwing set can be tilted horizontally, allowing this way to direct the material throwing selectively in a horizontally orientated sweeping (13), as it is represented on FIG. 5. The same possibility of horizontal orientation is obviously reached with a disposition of the throwing set in supporting assembly on a horizontal running gear, this without altering the concept.

The combination of the vertical directional regulation (10), with the horizontal directional regulation (13), allows to direct the material throwing to exact points, within a wide operation area; varying the area that can be covered with the throwing, in function of the simplicity of the throwing device, i.e. with mallets (2) on a single side of the inertia wheel 91), and with entrance (8) of materials through a single side of the frame (3); or in double realization, i.e. with the inertia wheel (1) provided with mallets (2) on both sides and with material entrance (8) on both sides of the frame (3), in which case the material throwing outlet (9) will obviously be double, thus covering the projection of the thrown materials, a bigger width.

The material entrance through the opening or openings (8) can also be carried out in a completely free way, without the need of previous selective screening, since the mallets (2) are able to impel any material that enters through the opening (8) to the frame interior (3).

On the inertia wheel (1), nevertheless, the disposition of some crushing edges (14) is foreseen, which collaborate with the mallets (2) in the revolvable material drag, impacting at first on these, so that when they are stones or blocks of a big size, they are broken into pieces of a smaller size by the impact, until they fit in the peripheral throwing channel (17).

The introduction of the material into the inside of the frame (3) can be carried out through a chute situated for such an effect, which can be loaded by means of the machine support itself, in combination with means on the machine that carry out the breaking off and the collection of the materials from the ground. Another solution is to load the feeding chute of the throwing device by means of the shovel of an independent tractor, by means of which the material is broken off and collected from the ground independently from the throwing machine support.

According to a realization, the throwing device can however be foreseen of a scraper (15) as an approaching funnel in connection with the entrance opening (8) of the materials to be thrown, incorporating the mentioned scraper (15) a blade (16) in frontal projection from the lower part.

This way the throwing device can be situated to be taken in traversely positioned haulage, by means of an agricultural tractor or similar vehicle, so that when it is located in low position the blade (16) is fixed into the ground, making that the materials which are cut off enter because of the advancing in the frame (3), through the mentioned scraper (15), obtaining this way the thrower feeding in a direct continuous way by only its movement.

What is claimed is:

1. A centrifugal matter throwing device, comprising:

a shaft;

a wheel mounted on said shaft for drivably rotating the wheel, said wheel having on a face thereof a plurality of shoveling members, comprising mallets fixed thereto and configured to impel matter introduced into the device when rotated, and said wheel further comprising at least one component disposed between the shaft and the mallets, each component having an edge for imparting an impact adapted to break the matter fed into the device through a front opening;

a frame around the wheel, said frame having said front opening through which the matter can be fed into the device, and a peripheral channel in which the matter is impelled by rotation of the shoveling members, the peripheral channel having an angularly adjustable peripheral opening through which the impelled matter is projected in a throw direction.

2. A centrifugal matter throwing device according to claim 1, wherein the frame is mounted on an assembly to provide movement around a vertical axis for angularly selecting the throw direction in a horizontal plane.

3. A centrifugal matter throwing device according to claim 1, wherein each component is elongate and aligned radially relative to the shaft.

4. A centrifugal matter throwing device according to claim 1, wherein the wheel has a plurality of mallets fixed on both sides thereof for impelling the matter introduced into the device, and wherein said frame comprises a pair of front openings, one for each side of the wheel.

* * * * *